Reissued Oct. 4, 1938

Re. 20,869

UNITED STATES PATENT OFFICE 20,869

COMPOSITION TOXIC TO LOWER FORMS OF LIFE

Euclid W. Bousquet, Wilmington, George D. Graves, Holly Oak, and Paul L. Salzberg, Carrcroft, Del., assignors, by mesne assignments, to E. I. du Pont de Nemours & Company, Wilmington, Del., a corporation of Delaware No Drawing. Original No. 2,030,093, dated February 11, 1936, Serial No. 649,448, December 29, 1932. Application for reissue October 1, 1937, Serial No. 166,858

8 Claims. (Cl. 167—22)

The present invention refers to compositions toxic to lower forms of life which comprise organic compounds containing in their molecule a straight carbon chain of 12 carbon atoms, substituted particularly at least at one of its end carbon atoms by a negative atom or a group containing such a negative atom, said carbon atoms also carrying hydrogen. By negative atom we mean a non-metallic element included in groups V, VI, and VII of the periodic system of elements, in other words, the substituents consist of or comprise nitrogen, phosphorous, oxygen, sulfur, selenium, tellurium or a halogen.

These derivatives of n-dodecane ($C_{12}H_{26}$) are all toxic to lower forms of life, particularly fungi, insects and more specifically soft bodied insects, and we attribute this characteristic toxicity to the hydrocarbon chain irrespective of the substituents described above which affect the toxicity only in a gradual manner.

n-Dodecyl alcohol or n-dodecanol $$CH_3(CH_2)_{11}OH$$

has become technically available by various synthetic methods. It is quite effective for controlling soft bodied insects, such as aphids, thrips, etc.

n-Dodecyl amine and its substitution products are similarly toxic to insects and can be used for controlling and combating lower forms of life.

Esters of n-dodecyl alcohol with organic or inorganic acids, particularly those containing sulfur and/or nitrogen are even more effective as insecticides than the straight n-dodecyl alcohol.

In the case of the esters of di- or polybasic acids with n-dodecyl alcohol, we may use the neutral esters but we prefer to use the partial esters so that the remaining acid groups can be used for obtaining water solubility. Sodium n-dodecyl sulfate, sodium di-n-dodecyl phosphate, sodium n-dodecyl xanthate, sodium n-dodecyl mercaptide, sodium n-dodecyl phthalate are examples of water soluble salts of partial n-dodecyl esters which can be used in this manner.

The n-dodecyl halogenids are regarded as esters of n-dodecyl alcohol with hydrohalogen acids. These esters as well as the esters of n-dodecyl alcohol with monobasic acids are substantially water insoluble. These, as well as other water insoluble n-dodecyl derivatives, are best used in the form of aqueous emulsions in the presence of the usual emulsifying and spreading agents, such as sulfonated vegetable, animal or mineral oils, soaps, alkylated hydrocarbon sulfonic acids, etc.

We also found that the toxicity of the n-dodecyl group persists in a number of other derivatives in which it is combined with other elements and groups. These toxic n-dodecyl derivatives can be represented by the type formula $CH_3—(CH_2)_{11}—X$ in which X is a substituent as characterized by the following four definitions:

1. X=OH, SH, SeH, TeH; OR, SR, SeR, TeR. R being an organic radical.

This includes n-dodecyl alcohol and its ethers as well as their sulfur, selenium and tellurium analogs; also esters of organic sulfur acids as xanthates, etc.

2. X=Inorganic acid radical.

This includes n-dodecyl chloride, bromide, fluoride, cyanide, sulfate, nitrate, phosphate, cyanate, sulfonate, etc.

3. X=—O—CO—R, the acyloxy radical.

This includes the organic n-dodecyl esters such as n-dodecyl formate, chloroacetate, benzoate, phthalate, etc.

4. $X=NR^1R^2$ where $R^1$ and $R^2$ may be hydrogen or an organic radical.

This includes n-dodecyl amines, n-dodecyl urea, n-dodecyl guanidine, n-dodecyl thiourea, di-n-dodecyl dithiocarbamate, etc., as well as their salts.

The toxicity of these n-dodecyl derivatives also persists if the n-dodecyl chain carries a negative substituent such as Cl, $SO_3H$ which does not modify the straight carbon chain character of the n-dodecyl radical.

Instead of pure n-dodecyl alcohol or its derivatives, we may use the crude n-dodecyl alcohol obtained by the hydrogenation of coconut oil or its free fatty acids, and the derivatives obtained from this crude alcohol. This product contains largely n-dodecyl alcohol with small amounts of the higher or lower homologs from n-octyl to cetyl alcohol, but the insecticidal value of such mixtures of alcohol or corresponding derivatives is dependent primarily on the content of n-dodecyl derivatives.

Among the large number of toxic n-dodecyl derivatives exemplified above we cite the following, which are of great merit for controlling insect pests thriving on vegetable life, and some of the results obtained by their use.

| Compound | Spreader | Insect | Percent kill |
|---|---|---|---|
| n-Dodecyl alcohol (0.2%) | Sulfonated fish oil (0.25%). | Black chrysanthemum aphids. | 98.6 |
| Potassium n-dodecylxanthate | Sulfonated fish oil (0.2%). | do | 99.6 |
| Potassium n-dodecylxanthate (0.1%). | do | do | 95.7 |
| n-Dodecyl amine (0.2%) | do | do | 81.5 |
| Tri-n-dodecyl amine (0.2%) | Potash fish oil soap (1.0%). | do | 99.8 |
| n-Dodecyl bromide (0.2%) | Sulfonated fish oil (0.2%). | Currant aphids. | 83.8 |
| n-Dodecyl diethyldithiocarbamate (0.1%). | do | Black chrysanthemum aphids. | 86.6 |
| n-Dodecyl alcohol with 10% o-cresol (0.2%). | None | Tobacco thrips. | 100. |

Our novel insecticides can also be used in fly sprays, preferably in combination with petroleum hydrocarbons such as kerosene. Their toxic action on the common house fly is very satisfactory. In three comparable experiments we have for instance sprayed flies with kerosene, with kerosene containing pyrethrum and with kerosene containing 10% n-dodecyl alcohol. The flies were kept under observation for 24 hours. All of the flies sprayed with kerosene recovered, whereas the pyrethrum kerosene spray gave 60% mortality and the n-dodecyl-alcohol kerosene spray gave 65% mortality.

The outstanding advantage of our new insecticides is their high toxicity in low concentrations and their harmlessness to plant life. We have found that n-dodecyl compounds and derivatives are unique in this respect. In view of the fact that ethyl alcohol can be applied in 100% concentration to aphids without giving complete control, it is surprising that n-dodecyl alcohol gives excellent control at 0.2% concentration.

Similarly, other long carbon chain alcohols and their derivatives have only a very mild toxic effect towards insects and other lower forms of life. We found, for instance, that primary or secondary alcohols or their derivatives containing carbon chains of less than 12 or more than 12 carbon atoms are considerably less effective than n-dodecyl alcohol or its derivatives. Thus, for instance, while potassium lauryl n-dodecyl xanthate at 0.2% concentration with sulfonated fish oil gave a 99–100% control on aphids, the control with potassium n-octadecyl xanthate was only 35–40%.

We also found that mixtures of alcohols containing from 10 to 13 carbon atoms consisting mainly of secondary alcohols as produced from unsaturated petroleum hydrocarbons have very low toxicity toward lower forms of life, such as fungi and insects.

We claim:

1. A composition toxic to lower forms of life comprising as the active toxic ingredient a substance selected from the group of substances consisting of n-dodecyl alcohol, n-dodecyl esters and n-dodecyl amines and their salts.

2. A composition toxic to lower forms of life comprising as an active toxic ingredient an n-dodecyl ester.

3. A composition toxic to lower forms of life comprising as the active toxic ingredient an n-dodecyl ester of an organic acid.

4. A composition toxic to lower forms of life comprising as the active toxic ingredient an n-dodecyl xanthate.

5. A composition toxic to lower forms of life comprising as the active toxic ingredient a compound containing a straight chain of 12 carbon atoms in which one of the end atoms carries hydrogen and a negative, non-metallic atom.

6. A composition toxic to lower forms of life comprising as the active toxic ingredient a compound containing a straight chain of 12 carbon atoms in which one of the end carbon atoms carries hydrogen and a non-metallic element included in groups V, VI, and VII of the periodic system of elements.

7. A composition toxic to lower forms of life comprising as the active toxic ingredient an n-dodecyl ester of an inorganic acid.

8. A composition toxic to lower forms of life comprising as an active toxic ingredient a compound selected from the group consisting of n-dodecyl amines and their salts.

EUCLID W. BOUSQUET.
GEORGE D. GRAVES.
PAUL L. SALZBERG.